United States Patent
Ying et al.

[11] Patent Number: 5,899,541
[45] Date of Patent: May 4, 1999

[54] LOW PROFILE RUBBER TRACKED SNOW VEHICLE WITH SNOW-CLEARING DRIVE WHEELS

[75] Inventors: John L. Ying, Leawood, Kans.; Jack L. Highfill, Kansas City, Mo.

[73] Assignee: Central Power Products, Inc., Grandview, Mo.

[21] Appl. No.: 08/798,318

[22] Filed: Feb. 10, 1997

[51] Int. Cl.⁶ .................................................. B62D 55/12
[52] U.S. Cl. ........................... 305/115; 305/199; 305/137
[58] Field of Search ..................... 305/100, 115, 305/195, 199, 136, 137, 127, 184, 192, 194, 197

[56] References Cited

U.S. PATENT DOCUMENTS

| | | | |
|---|---|---|---|
| 2,967,075 | 1/1961 | Christie | 305/115 X |
| 3,576,352 | 4/1971 | Sato et al. | 305/136 |
| 5,340,206 | 8/1994 | Young | 305/136 |
| 5,352,029 | 10/1994 | Nagorcka | 305/115 X |
| 5,632,538 | 5/1997 | Wiesner et al. | 305/197 X |

OTHER PUBLICATIONS

Charles Vogel Enterprise Brochure re Arrowhead Groomers no date.

Kässbohrer brochure re Pisten Bully model no date.

Bombardier brochure re BR–160 1994.

Bombardier brochure re BR–110 1996.

Tucker Sno–Cat Corporation brochure re Model 1000 May 1994.

*Primary Examiner*—Russell D. Stormer
*Attorney, Agent, or Firm*—Hovey, Williams, Timmons & Collins

[57] ABSTRACT

A snow and ice-clearing track assembly (16) for a vehicle (10) is provided which has a plurality of rotatable track wheels (22–26) including a specialized drive wheel (24) together with a continuous loop, substantially imperforate track (34) disposed about and engaging the wheels (22–26). The track (34) includes a plurality of inwardly extending drive lugs (36) which are received within circumferentially spaced lug openings (56) and snow and ice-clearing passages (58, 60) on opposite sides of the central openings (60). An alternate drive wheel (70) has a pair of polyurethane rings (84, 86) on opposite sides of lug-receiving openings (78) preventing buildup of ice and snow adjacent the drive wheel.

6 Claims, 2 Drawing Sheets

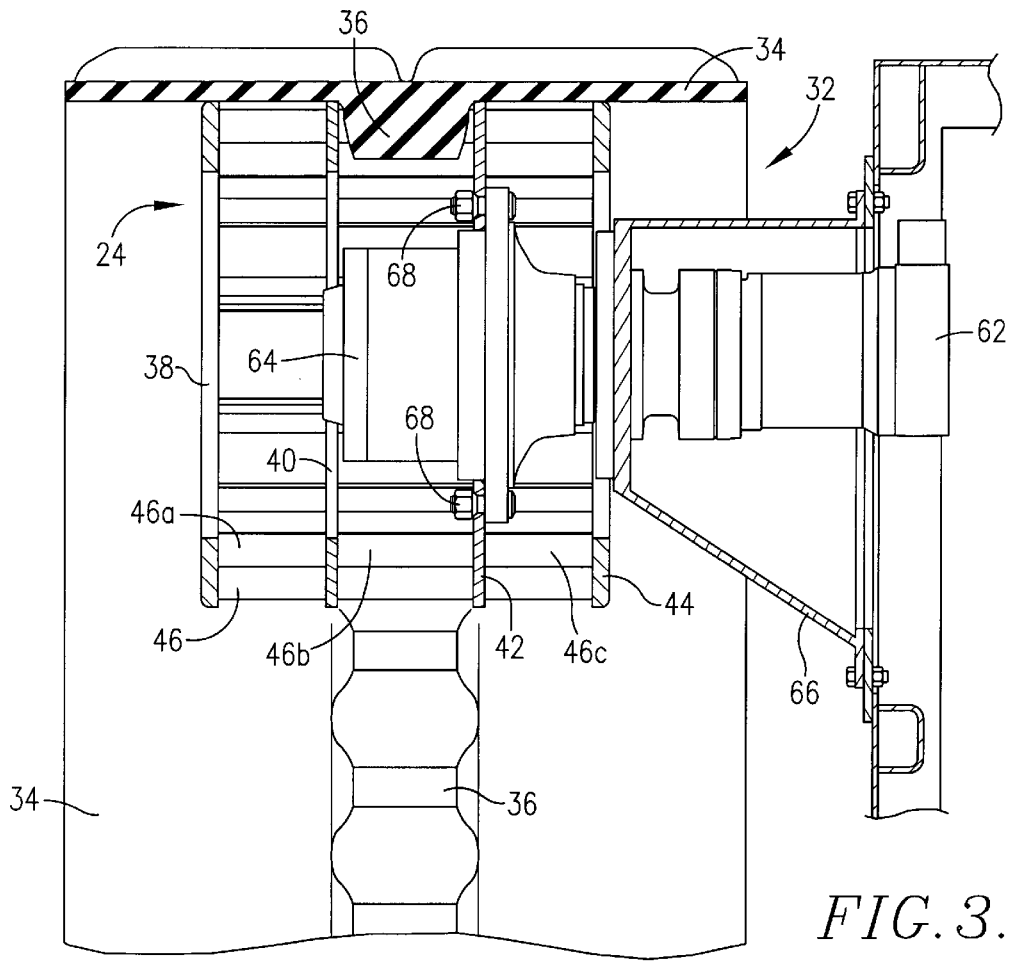
FIG. 3.
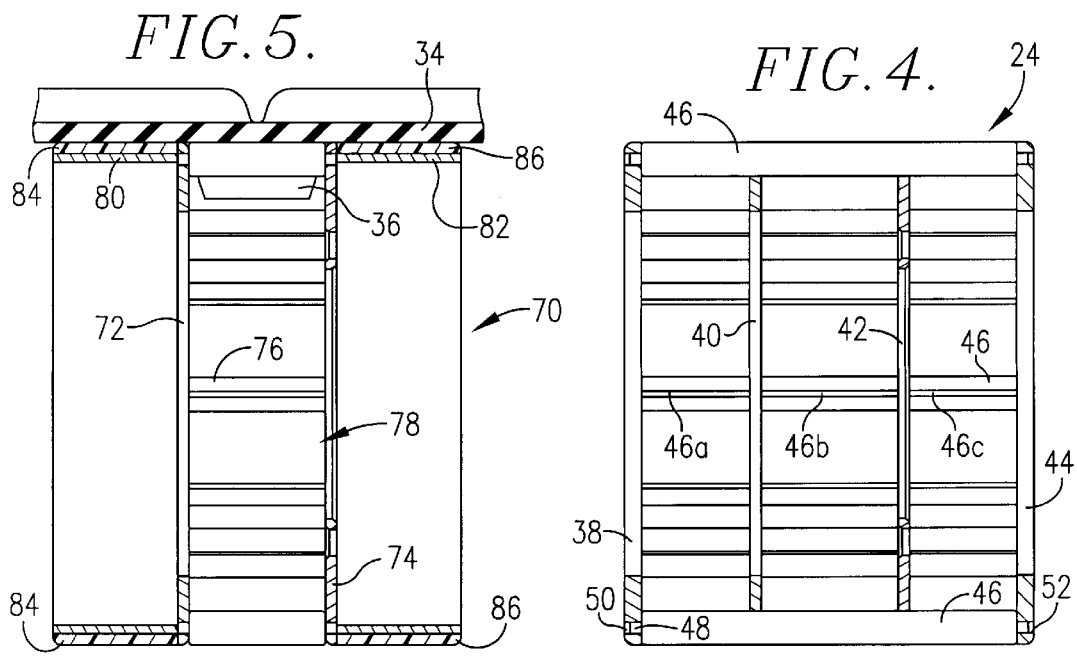
FIG. 5.
FIG. 4.

LOW PROFILE RUBBER TRACKED SNOW VEHICLE WITH SNOW-CLEARING DRIVE WHEELS

BACKGROUND OF THE INVENTION

1. Field of the Invention

The present invention is broadly concerned with tracked vehicles and the drive track assemblies thereof designed for use on snow and ice for ski and snow mobile trail dressing operations. More particularly, the invention pertains to specialized drive track assemblies for such vehicles which are specially modified so as to clear snow and ice adjacent the drive wheels of the track assemblies to thereby prevent buildup of snow and ice and consequent breakage thereof.

2. Description of the Prior Art

Owners of ski resorts are confronted with the problem of periodically "dressing" their ski and snow mobile trails to facilitate use thereof. Equipment has been designed for the dressing task, and generally includes a tracked vehicle equipped with a forward dozer blade as well as pull-behind snow dressing equipment. In use, the vehicle is driven along a trail to be dressed with the forward dozer blade clearing a path through freshly fallen or packed snow. The trailing dressing equipment completes the treatment by providing a generally flat surface of desired width or, in the case of cross-country ski trails, adjacent sets of narrow ski-receiving furrows.

One known class of tracked snow vehicle makes use of a pair of track assemblies each made up of relatively narrow, spaced-apart belts which support outwardly and transversely extending metallic angles or cleats. Such track assemblies are deficient in that the vehicles cannot be driven or used except in snow and ice. Thus, during the off-season, these vehicles are essentially useless. Moreover, they cannot be driven over conventional roadways for any distance because the track cleats will destroy the roadway.

Vehicle track assemblies made up of a series of track wheels supporting a continuous, substantially imperforate rubber track have also been proposed in the past. These track assemblies present significant potential advantages, in that the vehicle could be used year round and not limited solely to snow and ice operations. Thus, such a vehicle could be used in wintertime for trail dressing operations, and in summer for mowing or the like. Furthermore, such track assemblies can be driven over conventional roadways without damaging the latter or destroying the track assemblies.

Attempts at using rubber track assemblies of this type as a part of a snow dressing vehicle have met with a very serious problem, however. Specifically, it has been found that snow and ice picked up by the imperforate rubber track tends to rapidly build up in the region of the drive wheel of the track assembly. This in turn imposes stresses on the support axles of the forwardmost tensioning wheel, causing it to break. Indeed, experiments with conventional rubber track drive assemblies has proven that, in snow and ice conditions, the vehicles are rendered inoperative only after a short distance of travel.

There is accordingly a significant need in the art for an improved rubber track assembly having drive wheel structure which can effectively clear snow and ice and prevent undue buildup thereof between the drive wheel and the adjacent belt.

SUMMARY OF THE INVENTION

The present invention overcomes the problems outlined above and provides and improved vehicle track assembly having a plurality of separate, generally aligned rotatable track wheels including a drive wheel adapted for coupling with a power source such as a hydrostatic drive; the assembly further has a continuous loop, substantially imperforate rubber track disposed about and in engagement with the track wheels. The track includes a plurality of drive lugs extending inwardly from the inner surface thereof, while the track wheels are provided with a plurality of circumferentially spaced, lug-receiving openings about the periphery thereof. In order to prevent buildup of snow and ice adjacent the drive wheel, the latter includes specialized structure for clearing snow and ice therefrom during operation.

In one form of the invention, the drive wheel for each track assembly includes means defining a series of circumferentially spaced snow-clearing passages on opposite sides of the lug-receiving openings, allowing passage of snow and ice therethrough during operation of the track assembly. In this form of the invention, the drive wheel is advantageously made up of a plurality of laterally spaced-apart, substantially aligned annular rings with a series of pins extending laterally between and interconnecting the rings to define therewith the aforementioned lug-receiving openings and snow-clearing passages. The inner and outer rings effectively define corresponding face plates for the drive wheel, whereas the pins present circumferential track support means.

In another form of the invention, the snow and ice-clearing structure of the drive wheels includes continuous peripheral polyurethane rings disposed on opposite sides of the lug-receiving openings of the drive wheels. The polyurethane rings are designed for engagement with the inner surface of the track during operation of the track assembly, and furthermore permit rapid clearing of snow and ice which would otherwise accumulate the adjacent drive wheels.

BRIEF DESCRIPTION OF THE DRAWINGS

FIG. 3 is a fragmentary view in partial vertical section illustrating the drive wheel of a track assembly in accordance with the invention, depicting the hydrostatic drive coupled with the wheel and the orientation of the rubber track;

FIG. 4 is a view in partial vertical section of the drive wheel of FIG. 2, illustrating in detail the interconnection between the transverse crosspins and the annular rings making up the drive wheel; and FIG. 5 is a view in partial vertical section of an alternate drive wheel in accordance with the invention making use of peripheral track-engaging and snow and ice-clearing polyurethane rings.

DETAILED DESCRIPTION OF THE PREFERRED EMBODIMENT

Figure 1:
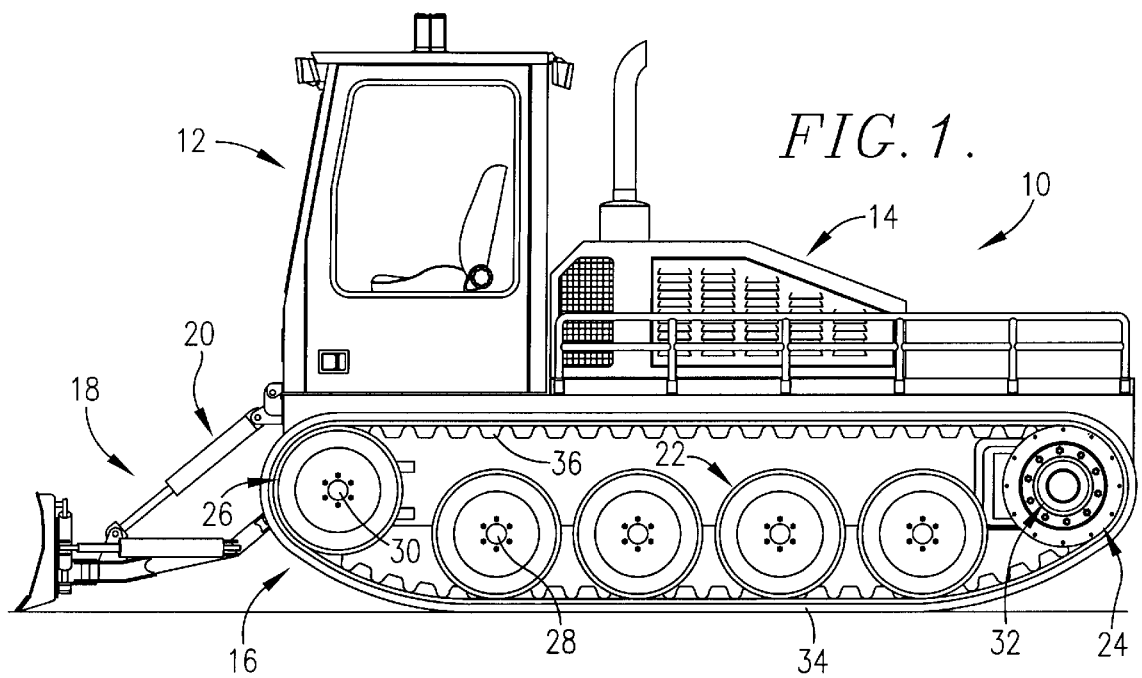
FIG. 1 is a side view of a snow vehicle in accordance with the invention having the improved track assemblies, with one such track assembly being shown in elevation.

Turning now the drawings, FIG. 1 illustrates a tracked vehicle 10 in accordance with the invention. The vehicle 10 includes an operator cab 12, a housing 14 for a diesel engine (not shown), and a pair of low profile track assemblies 16 on opposite sides of the cab and housing 12, 14 and supporting the vehicle for movement thereof. When used as snow dressing equipment, the vehicle 10 typically is equipped with a forward dozer blade 18, the latter being operated via conventional hydraulics 20. In addition, in such uses, pull-behind dressing implements (not shown) would be connected to the rear of the vehicle 10 for towing thereof.

Each track assembly 16 includes a total of six track wheels, including four lowermost idler wheels 22, a rearmost drive wheel 24 and a forwardmost tensioning wheel 26. Each of the wheels 22 and 26 is mounted on a corresponding axle 28, 30 as shown. Each rearmost drive wheel 24 is operably connected with a hydrostatic drive assembly 32 (FIG. 3). The overall assembly 16 further includes a continuous loop-type steel reinforced rubber track 34 which engages the track wheels 22–26 and is supported thereby. As best seen in FIG. 3, the track 34 is substantially imperforate and includes a series of central, axially spaced, inwardly extending integral drive lugs 36. The preferred assembly 16 is low-profile, i.e., the maximum vertical height thereof is less than twice the diameter of the drive wheel 24.

Figure 2:
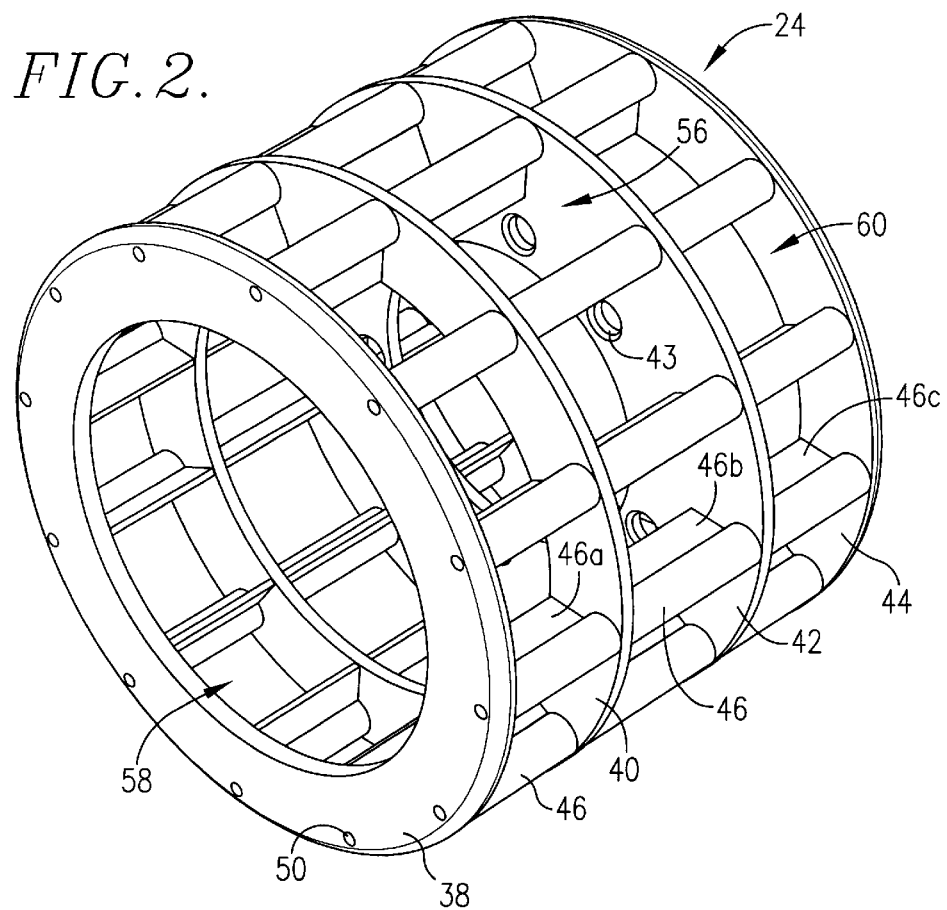
FIG. 2 is a perspective view of one of the preferred track assembly drive wheels of the invention; making use of snow and ice-clearing passages astride the central lug-receiving openings thereof.

Attention is next directed to FIGS. 2–4, which illustrate in detail the construction of the preferred drive wheel 24. In particular, the drive wheel 24 includes a series of four laterally spaced-apart substantially aligned annular rings 38, 40, 42, 44, with the rings 38 and 44 defining inner and outer face plates for the drive wheel. Ring 42 is also provided with a number of inner openings 43 permitting connection of a corresponding hydrostatic drive 32. A series of elongated, circumferentially spaced pin members 46 extend between and interconnect the rings 38–44. As best seen in FIG. 2, it will be observed that each pin 46 includes a reduced diameter extension 48 adjacent each end thereof which fit and are welded within corresponding openings 50, 52 provided in the rings 38 and 44. In addition, the inner rings 40 and 42 have circumferentially spaced notches 54 which receive the pins 46, permitting welding of the pins within the notches. Finally, each pin 46 includes three inwardly extending, welded in place reinforcing rib members 46a, 46b and 46c; as best seen in FIG. 4, each rib member 46a is welded in place between the rings 38 and 40, each rib member 46b is welded in place between rings 40 and 42, and each rib member 46c is welded in place between rings 42 and 44.

The drive wheel 24 thus presents a plurality of circumferentially spaced, peripheral lug openings 56 between the inner rings 40 and 42. In like manner, two circumferential series of snow and ice clearing passages 58, 60 are located astride the openings 56, i.e., the passages 58 extend between the rings 38 and 40, whereas the passages 60 extend between the rings 42 and 44.

As illustrated in FIG. 3, each drive wheel 24 is operatively coupled with hydrostatic drive 32. In particular, each hydrostatic drive 32 is made up of hydraulic motor 62 powered by the vehicle diesel, together with a conventional geared hub assembly 64 coupled to the motor 62. The assembly 32 is in part supported by bracket 66, with hub 64 secured to ring 42 by means of bolt and nut assemblies 68 passing through the connection openings 43. As will be readily understood by those skilled in the art, the assembly 32 thus serves to drive the wheels 24, in turn driving the rubber track 34 through the medium of lugs 36.

During wintertime operation of vehicle 10 in heavy snow and ice conditions, snow and ice picked up by the moving tracks 34 pass rightwardly as seen in FIG. I towards the associated drive wheels 24. However, instead of building up at the region of drive wheels 24, such snow and ice is passed inwardly through the respective passages 58, 60. Consequently, the vehicle 10 can be operated without fear of destruction of the track assemblies 16 owing to ice and snow buildup and interference.

FIG. 5 illustrates an alternate embodiment making use of a drive wheel 70 with the identical track 34 described previously. Each drive wheel 70 includes a pair of inboard rings 72, 74 with circumferentially spaced, transverse pin and rib assemblies 76 extending between and interconnecting the rings 72, 74. Each ring 74 is provided with connection openings (not shown) permitting attachment of a hydrostatic drive assembly, in the manner of drive wheel 24. Track lug-receiving openings 78 are defined between the spaced assembly 76 and the rings 72, 74 as shown. A pair of outwardly extending, annular metallic bodies 80, 82 are respectively secured to the periphery of each ring 72 as shown and are spaced slightly radially inwardly from the outermost margin of the corresponding ring. A continuous peripheral polyurethane ring 84, 86 is disposed about and attached to a corresponding body 80, 82 as shown such that the outer surface of each polyurethane ring is substantially coincident with the outermost margin of the adjacent metallic ring 72 or 74. In this form of the invention, the rings 84, 86 define snow and ice-clearing surfaces which substantially inhibit the buildup of ice and snow adjacent the drive wheels 70.

It will thus be seen that the invention provides improved track assemblies and drive wheels therefor which can be operated in wintertime ice and snow conditions. At the same time, the vehicle of the invention can be used in summer and be driven over conventional roadways.

We claim:

1. A vehicle track assembly comprising:

a plurality of separate, generally aligned, rotatable track wheels each presenting a periphery and having a width and including a drive wheel adapted for coupling with a power source; and a continuous loop track disposed about and in engagement with said track wheels, said track having a width at least as wide as the widths of said track wheels, and including a plurality of drive lugs extending inwardly from the inner surface thereof, each of said track wheels including structure defining a plurality of circumferentially spaced lug-receiving openings about the periphery thereof, said drive wheel having two series of circumferentially spaced snow-clearing passages respectively on opposite sides of said lug-receiving openings for passage of snow and ice therethrough during operation of the track assembly.

2. The track assembly of claim 1, said drive wheel comprising a plurality of laterally spaced-apart, substantially aligned annular rings with a series of pins extending between and interconnecting said rings and defining therewith said lug-receiving openings and said snow-clearing passages.

3. The track assembly of claim 1, including structure for connection of said drive wheel to a hydrostatic drive assembly.

4. The track assembly of claim 1, said track being substantially imperforate.

5. A drive wheel adapted for use as a part of a vehicle track assembly, said drive wheel comprising:

an annular body presenting opposed, laterally spaced apart, inner and outer face plates, a pair of annular, spaced apart inboard plates disposed between said inner and outer face plates, and circumferential supports extending between and operably coupled with said face plates and said inboard plates, said supports and said inner and outer face plates and said inboard plates defining lug-receiving openings located between said inboard plates and two series of circumferentially spaced passages respectively located on opposite sides of said lug-receiving openings, one of said series of passages between said outer face plate and the adjacent inboard plate, the other of said series of passages between said inner face plate and the adjacent inboard plate, said inner and outer face plates and said inboard plates having essentially the same outer diameters, the supports defining said series of passages presenting radially outwardly located track-engaging surfaces for supporting a continuous track having a width at least as wide as the distance between said inner and outer plates.

6. The drive wheel of claim 5, including structure for connection of said drive wheel to a hydrostatic drive assembly.

* * * * *